Feb. 21, 1950  J. R. C. QUILTER  2,498,505
PARACHUTE PACK

Filed Oct. 8, 1947  3 Sheets-Sheet 1

INVENTOR
John Raymond Cuthbert Quilter
BY John H Graham
HIS AGENT.

Feb. 21, 1950 J. R. C. QUILTER 2,498,505
PARACHUTE PACK
Filed Oct. 8, 1947 3 Sheets-Sheet 3
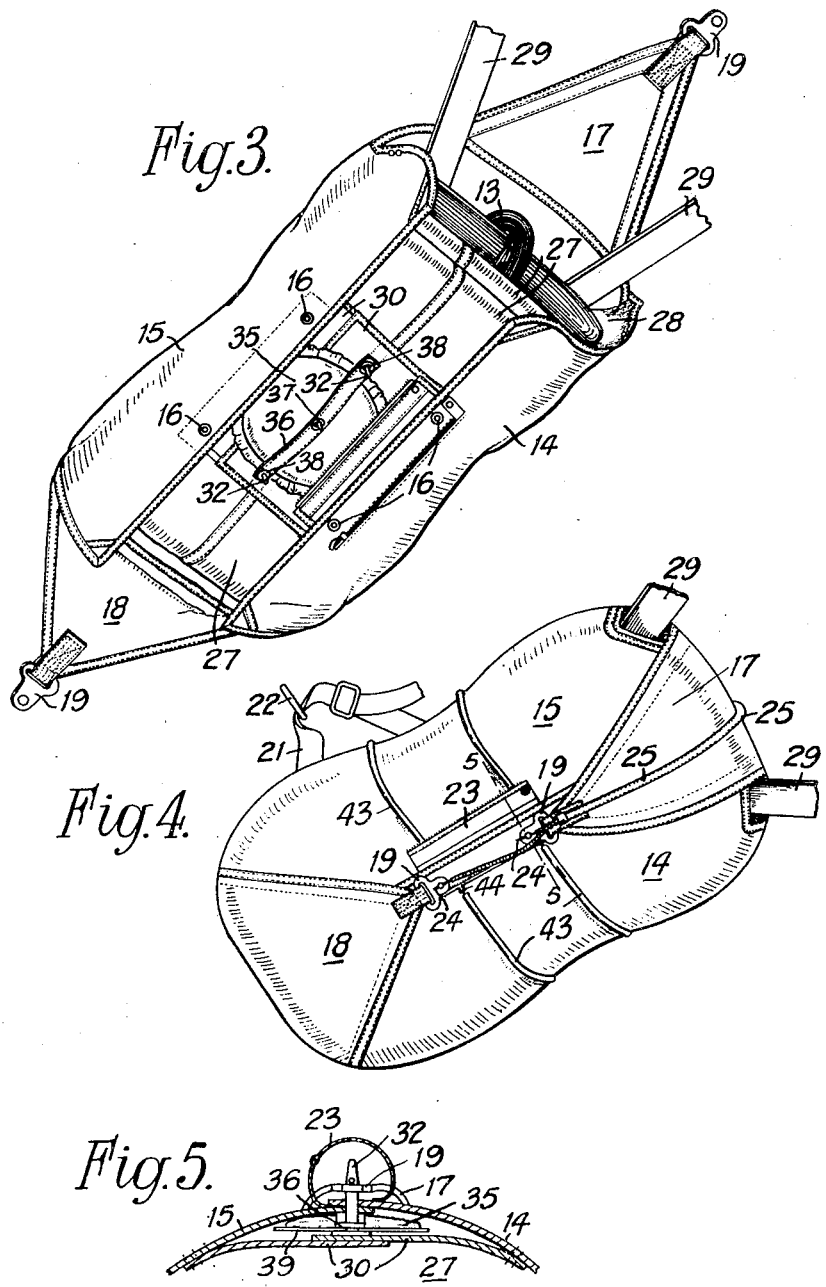
INVENTOR
John Raymond Cuthbert Quilter
BY John T Graham
HIS AGENT.

Patented Feb. 21, 1950

2,498,505

UNITED STATES PATENT OFFICE 2,498,505

PARACHUTE PACK

John Raymond Cuthbert Quilter,
Woking, England

Application October 8, 1947, Serial No. 778,646
In Great Britain October 18, 1946

11 Claims. (Cl. 244—148)

This invention relates to parachute packs for aviators and more particularly to packs having their main closure flaps normally locked by engagement with cones or studs through which a rip cord pin or the like is passed, and including an auxiliary or pilot parachute stowed separately from the main parachute.

The main object of the present invention is to provide an improved parachute pack of this kind, in which the auxiliary or pilot parachute is reliably held in its stowed position to prevent risk of displacement and consequent danger of entanglement with the main parachute when the pack is opened.

A further object of the invention is to provide positive means for holding the auxiliary or pilot parachute in position inside the pack but separated from the folded canopy of the main parachute.

Another object is to provide an improved parachute pack of the kind set forth, in which the auxiliary or pilot parachute is separated from the main parachute by at least one internal flap carrying locking means for engagement by the external or main closure flaps, the pilot parachute being itself anchored in position by a member engaged with said locking means prior to the engagement of said main closure flaps therewith.

Other objects and advantages of the invention will hereinafter appear from the following description of a preferred embodiment, given with reference to the accompanying drawings, in which—

Fig. 3 represents the pack with the main and auxiliary parachutes stowed therein, prior to the closing of the main flaps.

Fig. 4 represents the pack closed, the rip-cord pin cover being still unfastened.

Fig. 5 is a detail, in section on the line 5—5 of Fig. 4, showing the side closure flaps, the overlapping tunnel flaps attached thereto, and one of the locking cones engaged by the tape of the auxiliary parachute and by the main closure flaps.

Figure 1:
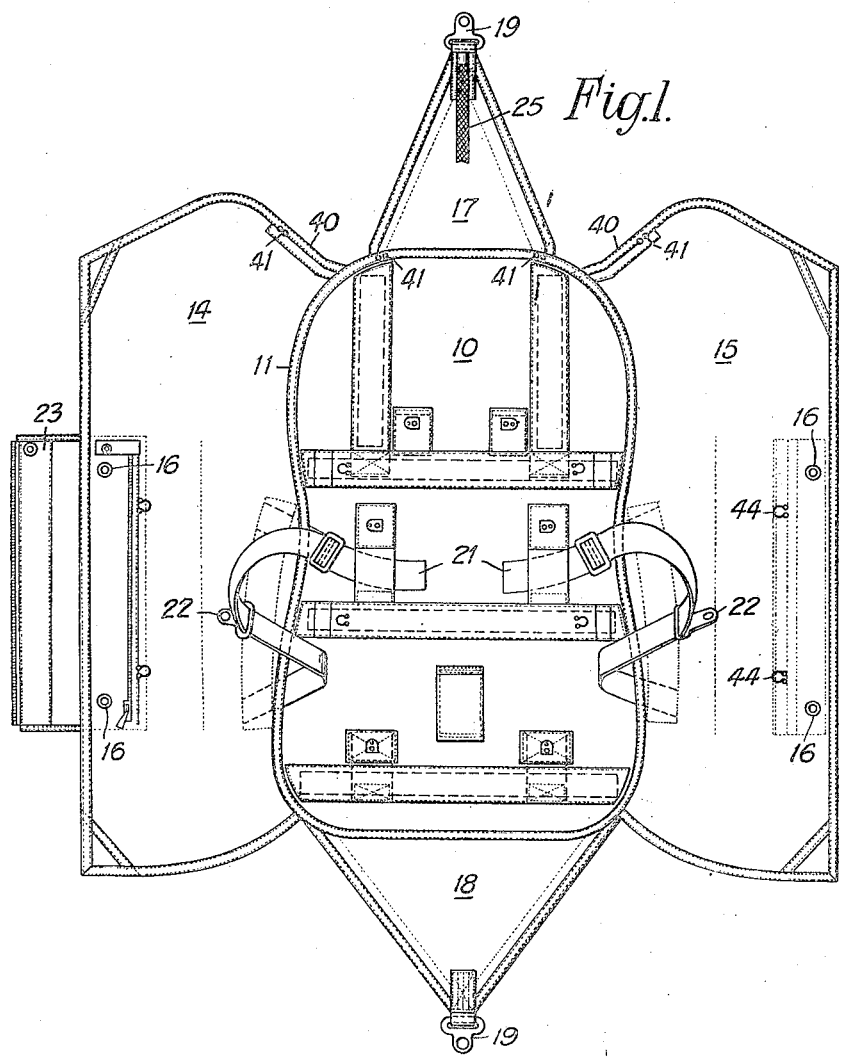
Fig. 1 is a rear elevation of the pack base with the closure flaps opened out.
Figure 2:
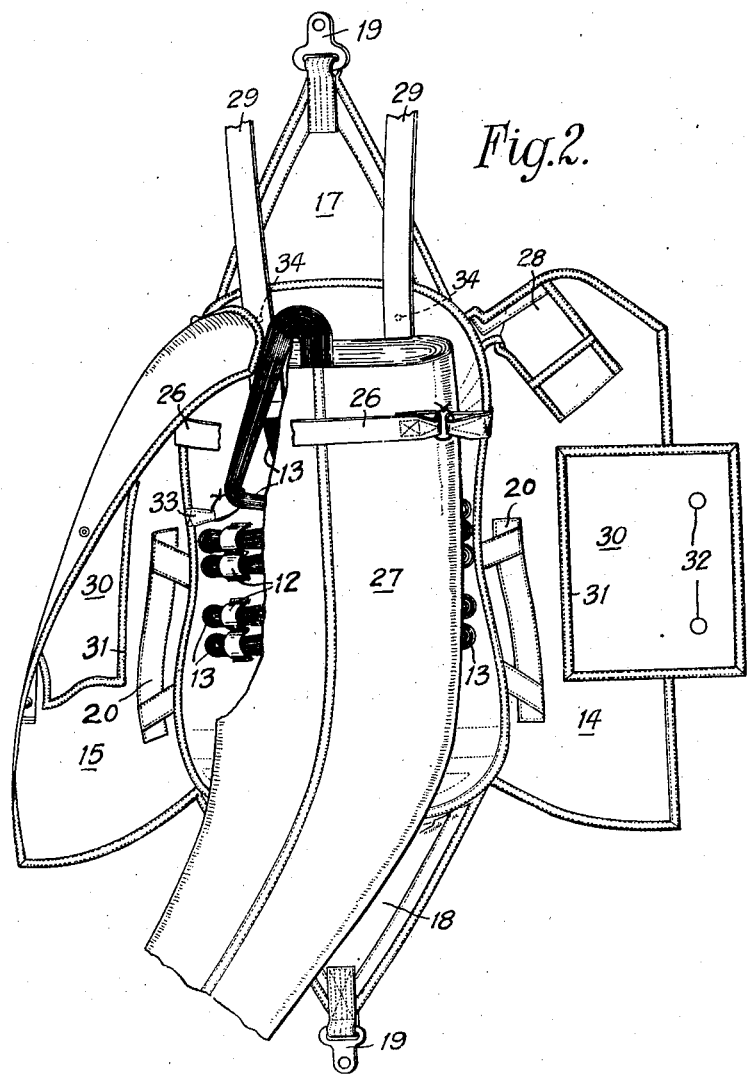
Fig. 2 represents the pack with the main parachute canopy partly stowed therein, the canopy being broken away on one side to show the rigging lines engaged under their retaining loops.

As illustrated in Figs. 1 and 2, a supporting base 10, shaped to fit upon the pilot's back and having the usual wire frame or stiffener 11 as well as two rows of retaining loops 12 for the stowage of the rigging lines 13, is provided with two side flaps 14, 15, adapted to overlap at their meeting edges, which are fitted with eyelets or grommets 16 for engaging a pair of locking cones or studs of the well-known kind; two flaps 17, 18 of triangular shape are provided at the top and bottom of the base, each of these flaps being fitted with a pack lug 19 for engaging one of the locking cones, and the top flap also carrying the rip-cord from which the usual locking wires or pins extend for connection to the locking cones. The side flaps may include internal reinforcing straps 20 from the top and bottom of which the belt adaptor straps 21 pass through slots to carry the locking devices 22 to be attached to a quick-release box worn on the pilot's chest. The right-hand side flap 14 may also carry the usual rip-cord pin cover 23 which can be fastened by a sliding clasp after the rip cord pins or wires 24 have been engaged with the locking cones, the rip cord housing 25 being attached to the top flap 17, as shown in Fig. 4.

Near the upper end of the pack base 10, there may be provided on the interior (Fig. 2) suitable means, such as tie-in strops 26, for holding the folded parachute canopy 27 in place over the rigging lines 13; cover pieces 28 attached to the upper edges of the side flaps may be stowed between the canopy and the rigging line connections to the lift webs 29.

Each of the side flaps is provided on its inner face with a tunnel flap 30 attached thereto by stitching along a vertical edge 31, the free edges of these flaps being adapted to overlap similarly to the main side flaps but preferably to a rather greater extent, as seen in Fig. 5. One of these tunnel flaps 30, for example that attached to the right-hand side flap 14, is fitted with two locking cones 32 near the top and bottom of its free edge, the vertical spacing of these cones being equal to that of the eyelets or grommets 16 (Fig. 1) upon the side flaps.

When the rigging lines 13 have been stowed in their retaining loops 12, with the lift webs 29 extending from the top of the pack base, the final loop of the bunched lines may be secured to a becket 33 at one side of the base by means of a single turn of thread; the lift webs 29 may also be fastened in position by means of press studs 34 engaging with corresponding sockets on the base 10. The folded parachute canopy 27 will then be laid in position upon the rigging lines and its peripheral portion secured, as shown in Fig. 1, by connecting together the tie-in strops 26 near the top of the base; after this, the canopy is folded back and forth along the full length of the base until the apex or dome is reached. The links connecting the lift webs 29 to the respective groups of rigging lines 13 are covered by the insertion of the cover pieces 28 attached to the side flaps, these pieces being placed over the links either before stowing the canopy 27 or afterwards by tucking them into place before closing down the main flaps 14, 15, 17, 18.

The pilot parachute 35, preferably of the type having the opening spring enclosed in a tubular bag from which radial vanes or gusset pieces extend to the shroud lines, and having an ejector board fitted upon a connecting cord between the main and pilot parachutes, is provided with a tape 36 extending diametrically across its top panel, the middle of this tape being secured at 37 to the said panel and its extremities being eyeletted at 38 to engage upon the locking cones 32. When the tunnel flaps 30 have been folded over the main parachute canopy 27, the flap carrying the locking cones 32 being arranged to overlap the other one, the ejector board 39 will be placed centrally between the two cones, and the pilot parachute 35 will be pressed down flat upon it, as seen in Fig. 5, the eyeletted tape 36 being set in line with the cones. The edges of the pilot canopy will be tucked in neatly to clear the cones and the latter pulled through the eyelets 38 at the ends of the tape, being held temporarily in engagement by the insertion of a long pin or wire.

The next stage will be to fold over the main side flaps 14, 15, engaging their eyelets or grommets 16 with the locking cones and replacing the temporary pin each time; similarly the top and bottom flaps 17, 18 will be closed by engaging their lugs 19 with the respective cones 32, and then the rip-cord will be placed in position with one pin 24 through each cone, preferably tied by a safety thread, the rip-cord assembly being enclosed by engaging the sliding clasp fastener of the cover 23. The top ends of the side flaps 14, 15 may be shaped as indicated at 40 in Fig. 1 to clear the lift webs 29 extending out of the pack, the edges of the top and side flaps being pulled tight against the webs and tied with cords passed through eyelets 41 (Fig. 1).

The harness is attached to the back of the pack by means of suitable loops or the like through which the belt and other parts of the harness are passed; the usual elastic ties 43 may be placed around the pack, as shown in Fig. 4, their ends being hooked on to eyes 44 sewn on the side flaps close to their overlapping edges.

The release of the parachute takes place in the normal way by operation of the rip-cord; the top, bottom and side flaps forming the main closure are thus freed from the locking cones 32. The opening spring then forces the pilot canopy tape 36 off the cones, while pressing the ejector board against the overlapping tunnel flaps 30, so that the latter holds the main canopy folded until the pilot parachute springs out of the pack; the tunnel flaps are then free to move aside as the main canopy 27 emerges under the pull of the connecting cord attached to its apex, the rigging lines 13 then drawing out of their retaining loops 12 and pulling the lift webs 29 clear of their press stud sockets.

What I claim is:

1. A parachute pack of the kind set forth, comprising a base, a plurality of main closure flaps attached to said base for covering the main and pilot parachutes stowed thereon, at least one flap for separating said main and pilot parachutes, said separating flap being attached to one of said main closure flaps, locking means carried by said separating flap, said locking means being adapted to engage said main closure flaps for maintaining the pack in closed condition, and means for connecting the pilot parachute to said locking means.

2. A parachute pack of the kind set forth, comprising a base, a plurality of main closure flaps attached to said base for covering the main and pilot parachutes stowed thereon, at least one flap for separating said main and pilot parachutes, said separating flap being attached to one of said main closure flaps, locking means carried by said separating flap, said locking means being adapted to engage said main closure flaps for maintaining the pack in closed condition, and positive means for anchoring the pilot parachute to said locking means.

3. A parachute pack of the kind set forth, comprising a base, a plurality of main closure flaps attached to said base for covering the main and pilot parachutes stowed thereon, at least one flap for separating said main and pilot parachutes, said separating flap being attached to one of said main closure flaps, locking means carried by said separating flap, said locking means being adapted to engage said main closure flaps for maintaining the pack in closed condition, and a member secured to said pilot parachute, said member being adapted for engagement with said locking means prior to said main closure flaps.

4. A parachute pack of the kind set forth, comprising a base, a plurality of main closure flaps attached to said base for covering the main and pilot parachutes stowed thereon, at least one flap for separating said main and pilot parachutes, said separating flap being attached to one of said main closure flaps, locking means carried by said separating flap, said locking means being adapted to engage said main closure flaps for maintaining the pack in closed condition, and a tape secured to the canopy of said pilot parachute, said tape including means for engagement with said locking means prior to said main closure flaps.

5. A parachute pack of the kind set forth, comprising a base, a plurality of main closure flaps attached to said base for covering the main and pilot parachutes stowed thereon, at least one flap for separating said main and pilot parachutes, said separating flap being attached to one of said main closure flaps, locking studs carried by said separating flap, eyelets carried by said main closure flaps for engagement with said locking studs for maintaining the pack in closed condition, and a member secured to said pilot parachute, said member including eyelets for engagement with said locking studs prior to the eyelets of said main closure flaps.

6. A parachute pack of the kind set forth, comprising a base, a plurality of main closure flaps attached to said base for covering the main and pilot parachutes stowed thereon, at least on flap for separating said main and pilot parachutes, said separating flap being attached to one of said closure flaps, locking studs carried by said separating flap, eyelets carried by said main closure flaps for engagement with said locking studs for maintaining the pack in closed condition, and a tape secured centrally to the canopy of said pilot parachute, said tape being provided with eyelets for engagement with said locking studs prior to the eyelets of said main closure flaps.

7. A parachute pack of the kind set forth, comprising a base, a plurality of main closure flaps attached to said base for covering the main and pilot parachutes stowed thereon, two oppositely disposed flaps for separating said main and pilot parachutes, said separating flaps being each attached at one edge to one of said main closure flaps and the two overlapping at other edges when folded over said main parachute stowed on said base, locking means carried by one of said separating flaps, said locking means being adapted to engage said main closure flaps for maintaining the pack in closed position, and means for connecting said pilot parachute to said locking means when stowed over said separating flaps prior to the engagement of said main closure flaps with said locking means.

8. A parachute pack of the kind set forth, comprising a base, a plurality of main closure flaps attached to said base for covering the main and pilot parachutes stowed thereon, two oppositely disposed flaps for separating said main and pilot parachutes, said separating flaps being each attached at one edge to one of said main closure flaps and the two overlapping at other edges when folded over said main parachute stowed on said base, locking studs carried by the overlying separating flap, eyelets carried by said main closure flaps for engagement with said locking studs for maintaining the pack in closed condition, and a member secured to said pilot parachute, said member including eyelets for engagement with said locking studs when said pilot parachute is stowed over said separating flaps prior to the engagement of said main closure flaps with said locking studs.

9. A parachute pack of the kind set forth, comprising a base, a plurality of external closure flaps attached to said base for covering the main and pilot parachutes stowed thereon, two oppositely disposed internal flaps for separating said main and pilot parachutes, said internal flaps being each attached at one edge to one of said external flaps and the opposite edges of said internal flaps overlapping when folded over said main parachute stowed on said base, locking studs carried by one of said internal flaps adjacent to said opposite edge thereof, eyelets carried by said external flaps for engagement with said locking studs for maintaining the pack in closed condition, and a tape secured centrally to the canopy of said pilot parachute, said tape being provided with eyelets for engagement with said locking studs when said pilot parachute is stowed over said overlapping internal flaps prior to the engagement of said external flaps with said locking studs.

10. A parachute pack of the kind set forth, comprising a base, a plurality of external closure flaps attached to said base for covering the main and pilot parachutes stowed thereon, two oppositely disposed internal flaps for separating said main and pilot parachutes, said internal flaps being each attached at one edge to one of said external flaps and the opposite edges of said internal flaps overlapping when folded over said main parachute stowed on said base, locking studs carried by one of said internal flaps adjacent to said opposite edge thereof, said locking studs being spaced apart by a distance at least equal to a transverse dimension of said pilot parachute when folded for stowage, eyelets carried by said external flaps for engagement with said locking studs for maintaining the pack in closed condition, and a tape secured centrally to the canopy of said pilot parachute, said tape being provided with eyelets for engagement with said locking studs when said pilot parachute is stowed over said overlapping internal flaps prior to the engagement of said external flaps with said locking studs.

11. A parachute pack of the kind set forth, comprising a base, a plurality of external closure flaps attached to said base for covering the main and pilot parachutes stowed thereon, two oppositely disposed internal flaps for separating said main and pilot parachutes, said internal flaps being each attached at one edge to one of said external flaps and the opposite edges of said internal flaps overlapping when folded over said main parachute stowed on said base, locking studs carried by one of said internal flaps adjacent to said opposite edge thereof, said locking studs being spaced apart by a distance at least equal to a transverse dimension of said pilot parachute when folded for stowage, an ejector board fitted between said main and pilot parachutes, said ejector board being of dimensions to fit flat between said locking studs, over said overlapping internal flaps and beneath said folded pilot parachute, eyelets carried by said external flaps for engagement with said locking studs for maintaining the pack in closed condition, and a tape secured centrally to the canopy of said pilot parachute, said tape being provided with eyelets spaced apart by a distance slightly greater than the spacing of said locking studs, said tape eyelets serving for engagement of said pilot parachute with said locking studs when said pilot parachute is stowed over said overlapping internal flaps prior to the engagement of said external flaps with said locking studs.

JOHN RAYMOND CUTHBERT QUILTER.

No references cited.